(12) United States Patent
Lee et al.

(10) Patent No.: US 8,120,322 B2
(45) Date of Patent: Feb. 21, 2012

(54) CHARGE EQUALIZATION APPARATUS

(75) Inventors: Joong Hui Lee, Daejeon (KR); Soo Yeup Jang, Daejeon (KR); Jeon Keun Oh, Daejeon (KR); Gun Woo Moon, Daejeon (KR); Chong Eun Kim, Daejeon (KR); Hong Sun Park, Daejeon (KR); Chol Ho Kim, Daejeon (KR)

(73) Assignees: SK Energy Co., Ltd., Seoul (KR); Korea Advanced Institute of Science and Technology, Daejon (KR)

( * ) Notice: Subject to any disclaimer, the term of this patent is extended or adjusted under 35 U.S.C. 154(b) by 58 days.

(21) Appl. No.: 12/449,313

(22) PCT Filed: Feb. 5, 2008

(86) PCT No.: PCT/KR2008/000735
§ 371 (c)(1),
(2), (4) Date: Feb. 19, 2010

(87) PCT Pub. No.: WO2008/097031
PCT Pub. Date: Aug. 14, 2008

(65) Prior Publication Data
US 2010/0148726 A1 Jun. 17, 2010

(30) Foreign Application Priority Data
Feb. 9, 2007 (KR) ........................ 10-2007-0013891

(51) Int. Cl.
*H02J 7/00* (2006.01)

(52) U.S. Cl. ........................................ 320/118; 320/119
(58) Field of Classification Search .................. None
See application file for complete search history.

(56) References Cited

U.S. PATENT DOCUMENTS

| | | | |
|---|---|---|---|
| 5,594,320 A | 1/1997 | Pacholok et al. | |
| 6,100,663 A | 8/2000 | Boys et al. | |
| 6,150,795 A * | 11/2000 | Kutkut et al. | 320/118 |
| 6,297,616 B1 | 10/2001 | Kubo et al. | |
| 6,356,055 B1 * | 3/2002 | Lin et al. | 320/116 |
| 6,373,223 B1 * | 4/2002 | Anzawa et al. | 320/118 |
| 6,538,414 B1 | 3/2003 | Tsuruga et al. | |
| 6,586,910 B2 * | 7/2003 | Matsui et al. | 320/122 |
| 2005/0269988 A1 * | 12/2005 | Thrap | 320/116 |

FOREIGN PATENT DOCUMENTS

| | | |
|---|---|---|
| KR | 20000010733 | 2/2000 |
| KR | 20010006576 | 1/2001 |

OTHER PUBLICATIONS

International Search Report mailed on May 23, 20080 by the Korean Intellectual Patent Office in counterpart foreign application No. PCT/KR2008/000735.

* cited by examiner

*Primary Examiner* — Ramy Ramadan
(74) *Attorney, Agent, or Firm* — Abelman, Frayne & Schwab

(57) ABSTRACT

The present invention relates to a charge equalization apparatus, in which series-connected batteries are divided into modules having certain sizes, and intra-module charge equalization and inter-module charge equalization are simultaneously performed, thus improving charge equalization performance and reducing the circuit size.

19 Claims, 9 Drawing Sheets

CHARGE EQUALIZATION APPARATUS

TECHNICAL FIELD

The present invention relates, in general, to a charge equalization apparatus for equalizing the charges of batteries, and, more particularly, to a charge equalization apparatus, in which batteries connected in series with each other are divided into modules having certain sizes, thus simultaneously performing intra-module charge equalization and inter-module charge equalization, improving charge equalization performance and reducing the size of circuits.

BACKGROUND ART

A plurality of systems uses a battery implemented as a battery pack or battery array, including a plurality of battery cells connected in series with each other.

When such a battery cell is charged to a much higher voltage or a much lower voltage than the voltage within a rated charge range, it may be dangerous.

Further, imbalance in the charged state of battery cells is caused by various factors, and occurs during the manufacture of batteries or the charge or discharge of batteries. In particular, in the case of lithium ion cells, the manufacture of cells is strictly controlled within a company to minimize the differences between the capacities of the cells of a battery array. However, imbalance or inequality between cells may occur due to various factors, regardless of the states of the cells, in which balance or equality is maintained after the cells are initially manufactured.

The factors influencing the imbalance of cells may include, for example, the chemical reactions, impedances and self-discharge rates of respective cells, reduction of the capacities of the cells, variation in the operating temperatures of the cells, and other types of variation between the cells.

Inconsistency in the temperature of cells is an important factor responsible for causing imbalance in cells. For example, "self-discharge" is caused in a battery cell, and is a function of a battery temperature. A battery having a high temperature typically has a self-discharge rate higher than that of a battery having a low temperature. As a result, the battery having a high temperature exhibits a lower charged state than the battery having a low temperature, with the passage of time.

Imbalance is a very series problem in the charged state of a battery. For example, this problem may typically occur in electric vehicles, and the capability of a battery to supply energy is limited by the battery cell having the lowest charged state.

If this battery cell is consumed, other battery cells lose the ability to continue to supply energy. This is the same even if the other battery cells still have the ability to supply power. Therefore, an imbalance in the charged state of battery cells reduces the power supply capability of the battery.

Of course, the above description does not mean that when one or more battery cells are consumed the supply of power by the remaining battery cells is completely impossible. However, it means that, only in the case of series connection, even if one or more battery cells are fully consumed, the battery can be continuously used as long as charge remains in the remaining battery cells, but, in that case, voltage having a reversed polarity is generated in the battery cell which has been fully discharged, and, as a result, the battery cell may be in danger of explosion due to the overheating thereof, or due to the generation of gas, and thus the battery loses power supply capability.

Various methods of correcting imbalance in the charged states of battery cells have been proposed, and one of the methods is shown in FIG. 1.

FIG. 1 is a diagram showing a conventional charge equalization apparatus.

Referring to FIG. 1, the conventional charge equalization apparatus includes a transformer T, control switches SW1 to SWn, and a voltage detection and drive signal generation unit 10.

The transformer T is configured such that it includes N primary windings and a single secondary winding, the N primary windings are connected to a common core, the primary windings and the secondary winding have different polarities, in other words, the dots of the primary windings and the dot of the secondary winding are placed on different sides, the N primary windings have the same number of turns, and a turns ratio of the primary windings to the secondary winding is N1:N2.

In the transformer T, the N primary windings are connected in parallel with N series-connected batteries B1 to Bn, respectively, and a diode D is connected between the secondary winding and the first battery B1, among the N series-connected batteries B1 to Bn, so as to prevent energy from being supplied by the N series-connected batteries B1 to Bn to the secondary winding.

The control switches SW1 to SWn are respectively connected between the second ends (terminals on which dots are not formed) of the primary windings of the transformer T and the anodes (−) of the batteries B1 to Bn, and are configured to form closed loops so as to supply energy from the batteries B1 to Bn to the primary windings of the transformer T1 in response to a drive signal provided by the voltage detection and drive signal generation unit 10.

The voltage detection and drive signal generation unit 10 detects the voltages of respective series-connected batteries B1 to Bn, compares the detected voltages with a reference voltage, and thus generates a drive signal required to discharge batteries charged to voltages greater than the reference voltage, that is, overcharged batteries.

The above-described charge equalization method, performed by the conventional charge equalization apparatus, is described in detail below.

First, the voltage detection and drive signal generation unit 10 detects the voltages of respective N series-connected batteries B1 to Bn.

As a result of the voltage detection, when it is determined that a charge imbalance exists between the N series-connected batteries B1 to Bn, the voltage detection and drive signal generation unit 10 simultaneously turns on all of the control switches SW1 to SWn.

Then, a charge automatically moves from a battery having a high voltage to a battery having a low voltage during the time for which the control switches SW1 to SWn are turned on, thus realizing charge equalization. Further, when the control switches SW1 to SWn are simultaneously turned off, energy stored in the magnetizing inductors of all of the primary windings is recharged in the N series-connected batteries B1 to Bn through the rectifying diode D on the secondary side.

In this way, the charge equalization apparatus of FIG. 1 realizes charge equalization because charge moves due to the difference between the voltages of the N series-connected batteries B1 to Bn.

Meanwhile, a lithium ion battery is disadvantageous in that, even if variation is present in the State of Charge (SOC) between respective batteries, the voltage difference is very small, and thus little charge movement occurs. Accordingly, the conventional charge equalization apparatus is problematic in that, when N lithium ion batteries are connected in series with each other, the charge equalization characteristics of the batteries are deteriorated.

Further, the conventional charge equalization apparatus is problematic in that, since a number of primary windings corresponding to the number of batteries is coupled to a single common core, it is difficult to manufacture a transformer when the number of batteries increases.

Furthermore, the conventional charge equalization apparatus is disadvantageous in that, as the number of batteries increases, the voltage stress on a diode for providing a current path for the magnetizing current so as to prevent the saturation of the transformer increases.

DISCLOSURE

Technical Problem

Accordingly, the present invention has been made keeping in mind the above problems occurring in the prior art, and the present invention is intended to provide a charge equalization apparatus, which can improve charge equalization characteristics, and can enable transformers to be easily manufactured.

Further, the present invention is intended to provide a charge equalization apparatus, in which series-connected batteries are divided into modules, having certain sizes, thus simultaneously performing intra-module charge equalization and inter-module charge equalization.

Technical Solution

In accordance with an aspect of the present invention, there is provided a charge equalization apparatus for equalizing charges of M*N batteries, the charge equalization apparatus being configured such that the M*N batteries are connected in series and are divided into N battery modules, each having M series-connected batteries, comprising N intra-module charge equalization units, each connected in parallel with respective M series-connected batteries existing in each battery module, supplied with charge from the M series-connected batteries, and configured to discharge overcharged batteries and to charge undercharged batteries, thus equalizing charges of the M series-connected batteries; an inter-module charge equalization unit connected in parallel with respective N battery modules and configured to discharge overcharged battery modules, among the N battery modules, and to charge undercharged battery modules, thus equalizing charges of the N battery modules; and a voltage detection and drive signal generation unit configured to detect voltages of respective M*N batteries, to set an average voltage of the detected voltages as a reference voltage, to generate a drive signal using both the detected voltages and the reference voltage, and to control driving of the N intra-module charge equalization units and the inter-module charge equalization unit by providing the generated drive signal to the N intra-module charge equalization units and the inter-module charge equalization unit.

Advantageous Effects

Accordingly, the present invention is advantageous in that, since series-connected batteries are divided into modules, intra-module charge equalization and inter-module charge equalization can be simultaneously performed, so that complete charge equalization can be realized, thus obtaining desired charge equalization performance.

Further, the present invention is advantageous in that additional charge equalization is realized by inducing magnetizing current to undercharged batteries, thus improving charge equalization performance.

Further, the present invention is advantageous in that intra-module charge equalization units and an inter-module charge equalization unit are separated, thereby performing intra-module charge equalization and inter-module charge equalization, not only simultaneously but also independently.

Furthermore, the present invention is advantageous in that, since magnetizing current is charged in undercharged batteries, among series-connected batteries, a turns ratio of a transformer in the inter-module charge equalization unit is 1:1, thus enabling the transformer to be easily manufactured.

DESCRIPTION OF REFERENCE CHARACTERS OF IMPORTANT PARTS

10, 120: voltage detection and drive signal generation unit
1001 to 100n, 2001 to 200n: intra-module charge equalization unit
110, 210: inter-module charge equalization unit 122: sensing unit
124: microprocessor 126: switch driving circuit unit

MODE FOR INVENTION

Hereinafter, embodiments of the present invention will be described in detail with reference to the attached drawings.

Figure 1:
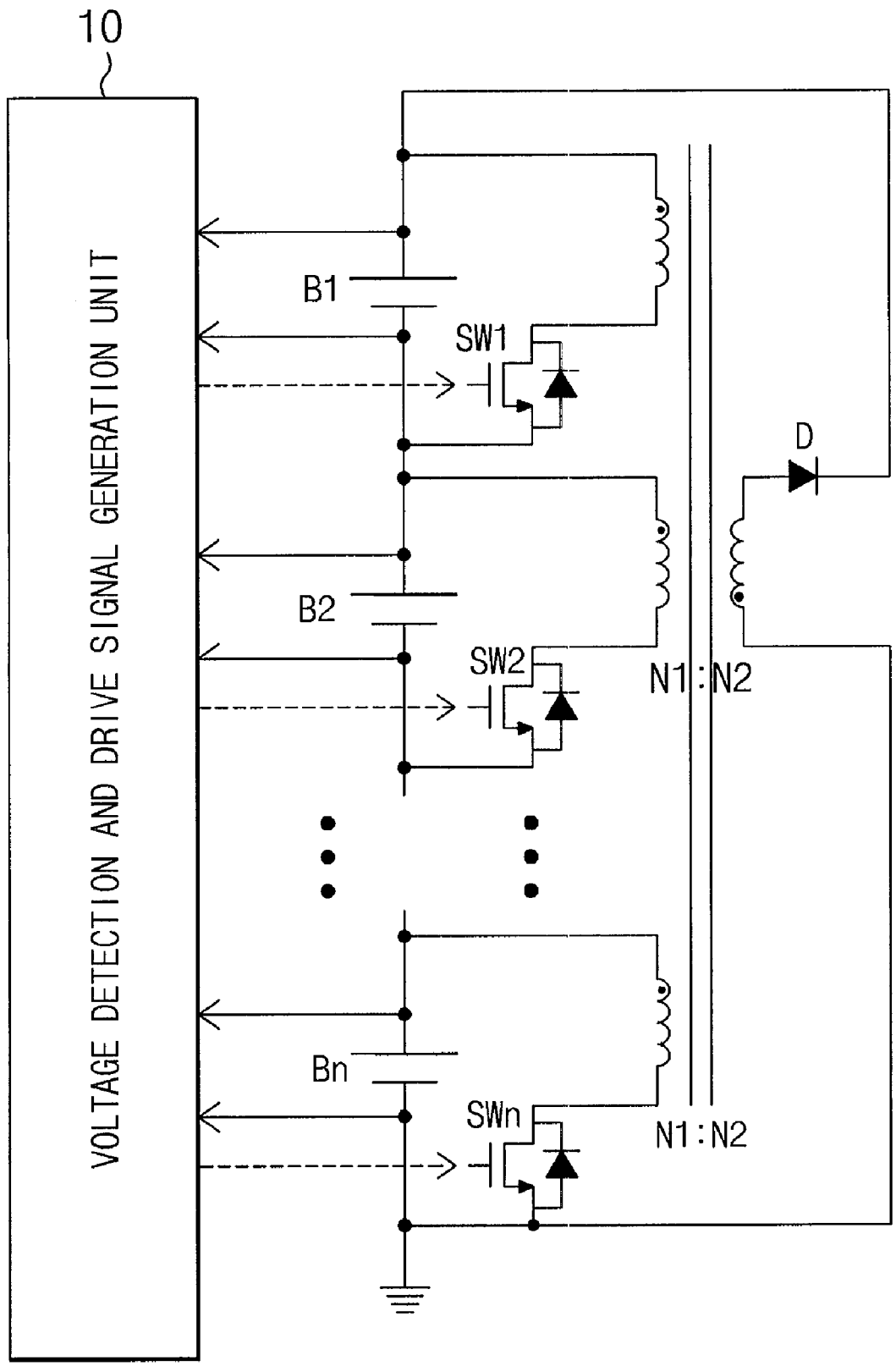
FIG. 1 is a diagram showing a conventional charge equalization apparatus.
Figure 2:
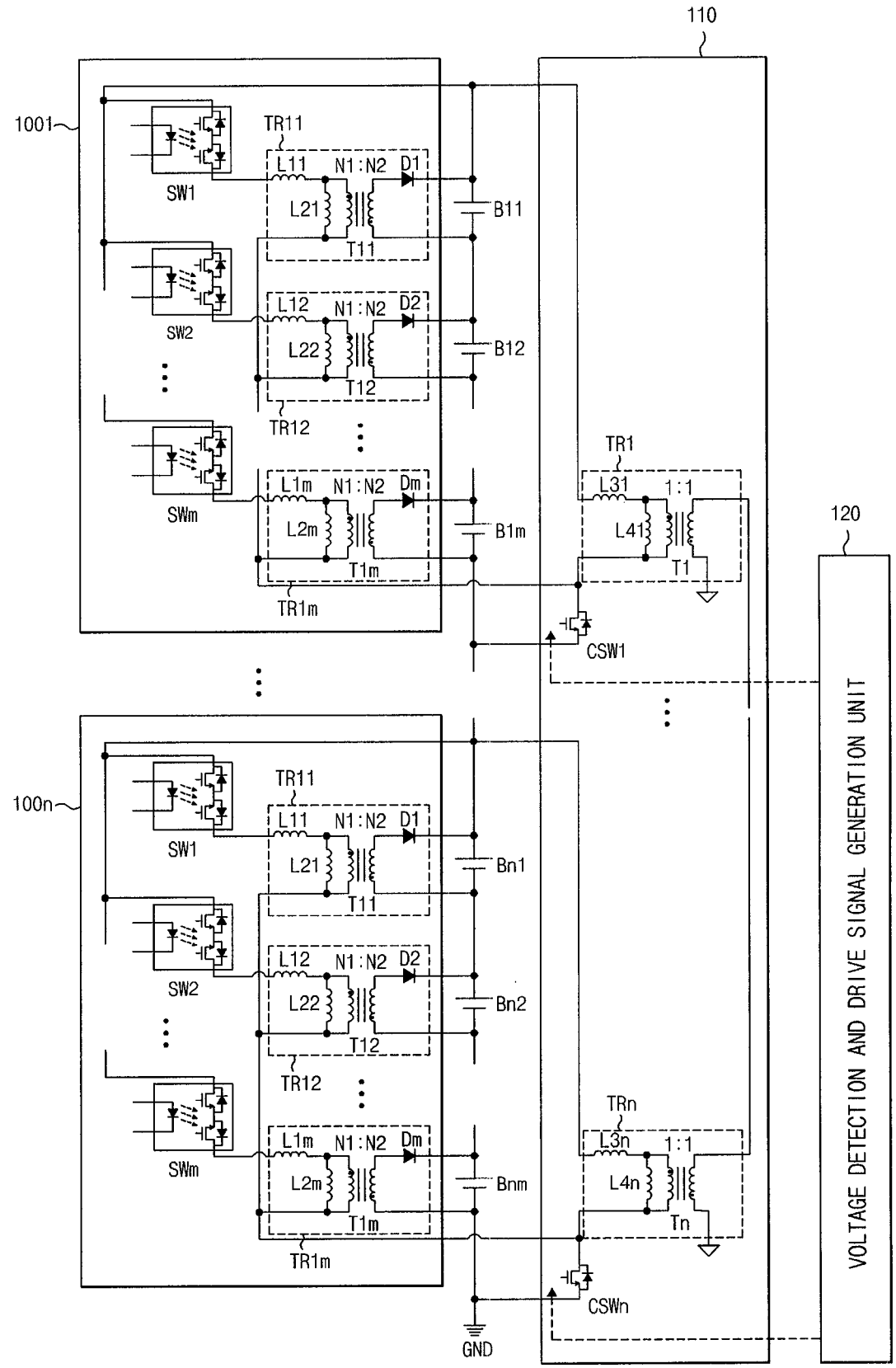
FIG. 2 is a diagram showing a charge equalization apparatus according to an embodiment of the present invention.
Figure 3:
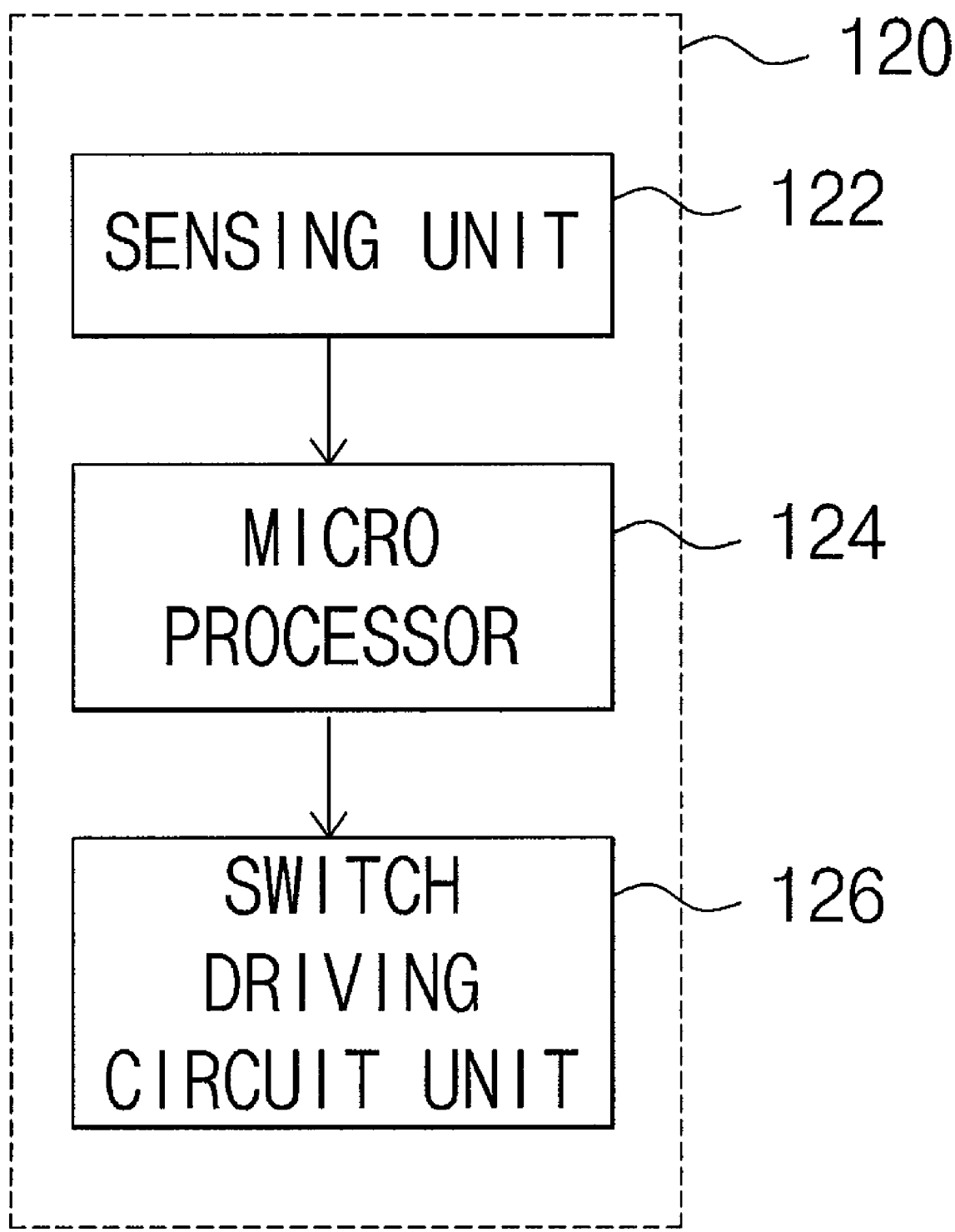
FIG. 3 is a diagram showing the voltage detection and drive signal generation unit of FIG. 2.

FIG. 2 is a diagram showing a charge equalization apparatus according to an embodiment of the present invention, and FIG. 3 is a diagram showing the voltage detection and drive signal generation unit 120 of FIG. 2.

Referring to FIGS. 2 and 3, the charge equalization apparatus according to an embodiment of the present invention includes N intra-module charge equalization units 1001 to 100n, each connected in parallel with respective M series-connected batteries, supplied with a charge from the M series-connected batteries, and configured to equalize the charges of the M series-connected batteries by discharging overcharged batteries and charging undercharged batteries when M*N batteries are connected in series and are divided into N battery modules, each having M series-connected batteries, an inter-module charge equalization unit 110 connected in parallel with respective N battery modules, and configured to discharge overcharged battery modules and to charge undercharged battery modules among N battery modules, thus equalizing the charges of the N battery modules, and a voltage detection and drive signal generation unit 120 configured to detect the voltages of respective M*N batteries, set the average voltage of the detected voltages to a reference voltage, generate a drive signal using both the detected voltages and the reference voltage, and control the driving of the N intra-module charge equalization units 1001 to 100n and the inter-module charge equalization unit 110 by providing the generated drive signal to the N intra-module charge equalization units 1001 to 100n and the inter-module charge equalization unit 110.

Here, since the M series-connected batteries can be grouped into a module, they can be designated as a battery module.

Each of the N intra-module charge equalization units 1001 to 100n includes M first transformer units TR11 to TR1m, which are respectively connected in parallel with the M series-connected batteries and are configured to store a charge supplied by the M series-connected batteries and to supply the stored charge to undercharged batteries, among the M series-connected batteries, thus equalizing the charges of the M series-connected batteries, M charge/discharge control switches SW1 to SWm, which are connected between the first ends (terminals on which dots are formed) of the primary windings of the M first transformer units TR11 to TR1m and the cathode (+) of the first battery B11, B21, ..., or Bn1 of the M series-connected batteries so as to supply the charge, supplied by the M series-connected batteries, to the primary windings of the first transformer units TR11 to TR1m, and M semiconductor switching devices D1 to Dm, which are connected between the first ends (terminals on which dots are not formed) of the secondary windings of the first transformer units TR11 to TR1m and the cathodes (+) of the M series-connected batteries so as to prevent a charge, supplied by the M series-connected batteries, from being supplied to the secondary windings of the first transformer units TR11 to TR1m.

The M first transformer units TR11 to TR1m are respectively connected in parallel with the M series-connected batteries so as to decrease the voltages of batteries having voltages greater than a first reference voltage in each battery module, that is, overcharged batteries, to the first reference voltage, and to increase the voltages of batteries having voltages less than the first reference voltage, that is, undercharged batteries, to the first reference voltage.

Here, the term 'first reference voltage' means the average voltage of each battery module, that is, M series-connected batteries.

Each of the M first transformer units TR11 to TR1m includes a first transformer T11 to T1m, which is connected in parallel with a corresponding one of the M series-connected batteries and is configured to store a charge, supplied by the M series-connected batteries, and to supply the stored charge to undercharged batteries among the M series-connected batteries, a first inductor L11 to L1m, which is connected between the first end of the primary winding of the first transformer T11 to T1m and a corresponding one of the charge/discharge control switches SW1 to SWm, and a second inductor L21 to L2m, which is connected between both ends of the primary winding of the first transformer T11 to T1m so as to store a charge, supplied by the M series-connected batteries B1 to Bn, in the form of magnetizing current.

The first ends of the primary windings of the first transformers T11 to T1m are respectively connected to the first inductors L11 to L1m, and the second ends of the primary windings thereof (terminals on which dots are not formed) are connected in common to each other. The first ends of the secondary windings (terminals on which dots are not formed) are respectively connected to the anodes of the semiconductor switching devices D1 to Dm, and the second ends thereof (terminals on which dots are formed) are respectively connected to the anodes (−) of the batteries.

The above-described first transformers T11 to T1m are each implemented in the form of a flyback structure, in which a primary winding and a secondary winding have different polarities, that is, in which a dot formed on the primary winding and a dot formed on the secondary winding are placed on different sides. Each of the first transformers T11 to T1m has a turns ratio of the primary winding to the secondary winding thereof of N1:N2.

In this embodiment, each of the first transformer units TR11 to TR1m is implemented using a flyback structure in which primary and secondary windings have different polarities, that is, in which dots formed on the primary winding and the secondary winding are placed on different sides, but my be implemented using a forward structure, in which the primary and secondary windings have the same polarity, that is, in which dots formed on the primary and secondary windings are placed in the same side.

The second inductors L21 to L2m are connected between both ends of respective primary windings of the first transformers T11 to T1m, and are configured to store a charge supplied by a relevant battery module in the form of magnetizing current when the charge/discharge control switches SW1 to SWm and redistribution switches CSW1 to CSWn, installed in the inter-module charge equalization unit 110, are turned on.

The charge/discharge control switches SW1 to SWm are respectively connected between the cathode (+) of the first battery B11, B21, ..., or Bn1 of the M series-connected batteries and the first inductors L11 to L1m, and are configured such that they are turned on in response to a high-level first drive signal, which is provided by the voltage detection and drive signal generation unit 120, and form a closed loop so that the charge from the battery module is supplied to the primary windings of the first transformer units TR11 to TR1m.

In other words, the charge/discharge control switches SW1 to SWm are turned on in response to the high-level first drive signal provided by the voltage detection and drive signal generation unit 120, thus forming a closed loop so that the charge supplied by the M series-connected batteries can be supplied both to the first inductors L11 to L1m and to the second inductors L21 to L2m, which are connected to the primary windings of the first transformer units TR11 to TR1m.

Accordingly, when the charge/discharge control switches SW1 to SWm are turned on, magnetizing current is stored in the second inductors L21 to L2m.

Further, the charge/discharge control switches SW1 to SWm are turned off in response to a low-level second drive signal, provided by the voltage detection and drive signal generation unit 120, thus preventing the charge supplied by the battery module from being supplied to the primary windings of the first transformer units TR11 to TR1m.

The high-level first drive signal is provided to the above-described charge/discharge control switches SW1 to SWm for a longer time so that batteries having relatively low voltages, among the M series-connected batteries, are charged for a longer time, and is provided to the switches SW1 to SWm for a shorter time so that batteries having relatively high voltages are charged for a shorter time.

That is, when it is assumed that M is 3, in other words, when three batteries are connected in series in a single module, and, of the batteries, the second battery is overcharged and the remaining batteries are undercharged, the high-level first drive signal is provided to a charge/discharge control switch corresponding to one of the first and third batteries, having a higher voltage, for a shorter time, and is provided to a charge/discharge control switch corresponding to the remaining one of the first and third batteries, having a lower voltage, for a longer time.

The charge/discharge control switches SW1 to SWm are electrically insulated, and are implemented using solid-state relays, enabling bidirectional current flow.

The semiconductor switching devices D1 to Dm are respectively connected between the first ends of the secondary windings of the first transformer units TR11 to TR1$m$ and the cathodes (+) of the M series-connected batteries, and function to rectify energy when the energy supplied to the secondary windings of the first transformer units TR11 to TR1$m$ is supplied to the relevant battery module.

Further, the semiconductor switching devices D1 to Dm prevent the charge supplied by the battery module from being supplied to the secondary windings of the first transformer units TR11 to TR1$m$.

The semiconductor switching devices D11 to D1$m$ are implemented using diodes, but may be implemented using one of switching devices, such as Metal Oxide Semiconductor Field Effect Transistors (MOSFETs), Bipolar Junction Transistors (BJTs), and relays.

The inter-module charge equalization unit 110 includes N second transformer units TR1 to TRn, which are connected in parallel with the N series-connected battery modules and are configured to store a charge supplied by the N series-connected battery modules and to supply the stored charge to the undercharged battery modules among the N series-connected battery modules, thus equalizing the charges of the N series-connected battery modules, and N redistribution switches CSW1 to CSWn, which are connected between both the common nodes of the second ends (terminals on which dots are not formed) of the primary windings of the first transformer units TR11 to TR1$m$ and the second ends of the primary windings of the second transformer units TR1 to TRn, and the anodes (−) of the last batteries B1$m$, B2$m$, ..., Bnm of respective battery modules in order to form closed loops so that the charge supplied by the battery modules is supplied to the primary windings of the first transformer units TR11 to TR1$m$ and the primary windings of the second transformer units TR1 to TRn.

The second transformer units TR1 to TRn are respectively connected in parallel with the battery modules so as to decrease the voltages of overcharged battery modules, among the N battery modules, to a second reference voltage and to increase the voltages of undercharged battery modules to the second reference voltage.

Here, the term 'second reference voltage' means the average voltage of the N battery modules.

Each of the second transformer units TR1 to TRn includes a second transformer T1 to Tn, which is connected in parallel with a corresponding one of the N series-connected battery modules and is configured to store a charge supplied by the N series-connected battery modules and to supply the stored charge to an undercharged battery module among the N series-connected battery modules, a third inductor L31 to L3$n$, which is connected between the first end (terminal on which a dot is formed) of the primary winding of the second transformer T1 to Tn and the cathode (+) of the first battery B11, B21, ..., or Bn1 of a corresponding battery module, and a fourth inductor L41 to L4$n$, which is connected between both ends of the primary winding of the second transformer T1 to Tn so as to store a charge supplied by the N series-connected battery modules in the form of magnetizing current.

In this case, the first ends of the primary windings of the second transformers T1 to Tn are respectively connected to the third inductors L31 to L3$n$, and the second ends thereof (terminals on which dots are not formed) are connected both to the common nodes of the second ends of the primary windings of the first transformer units TR11 to TR1$m$, installed in the intra-module charge equalization units 1001 to 100$n$, and to the redistribution switches CSW1 to CSWn. The first ends (terminals on which dots are not formed) of the secondary windings of the second transformers T1 to Tn are connected in common to each other, and the second ends thereof (terminals on which dots are formed) are connected in common to each other.

The second transformers T1 to Tn are each implemented in the form of a flyback structure, in which a primary winding and a secondary winding have opposite polarities, that is, in which a dot formed on the primary winding and a dot formed on the secondary winding are placed on different sides. In each of the second transformers T1 to Tn, the primary winding and the secondary winding have the same number of turns, that is, a turns ratio thereof of 1:1.

In this embodiment, each of the second transformers T1 to Tn is implemented using a flyback structure, but may be implemented using a forward structure, in which the polarities of the primary and secondary windings are the same, that is, in which dots formed on the primary and secondary windings are placed on the same side.

The third inductors L31 to L3$n$ are respectively connected between the primary windings of the second transformers T1 to Tn and the cathodes (+) of the first batteries B11, B21, ..., Bn1 of respective battery modules, and the fourth inductors L41 to L4$n$ are respectively connected between both ends of the primary windings of the second transformers T1 to Tn.

The fourth inductors L41 to L4$n$ function to store charge supplied by the N battery modules in the form of magnetizing current when the redistribution switches CSW1 to CSWn are turned on.

The redistribution switches CSW1 to CSWn are connected between the second ends of the primary windings of the second transformer units TR1 to TRn and the anodes (−) of the last batteries B1$m$, B2$m$, ..., Bnm of respective battery modules, and are configured such that they are turned on in response to a high-level first drive signal, provided by the voltage detection and drive signal generation unit 120, and form closed loops so that the charge supplied by the N series-connected battery modules is supplied to the primary windings of the second transformer units TR1 to TRn.

Further, the redistribution switches CSW1 to CSWn are turned on in response to a high-level first drive signal, provided by the voltage detection and drive signal generation unit 120, thus forming closed loops so that the charge supplied by the battery modules is supplied to the primary windings of the first transformer units TR11 to TR1$m$.

Accordingly, the redistribution switches CSW1 to CSWn are operated not only to allow the intra-module charge equalization units 1001 to 100$n$ to equalize the voltages of the battery modules, but also to allow the inter-module charge equalization unit 110 to equalize the voltages of the N battery modules.

The redistribution switches CSW1 to CSWn are implemented using N-type MOSFETs, but are not limited to N-type MOSFETs, and may be implemented using one of switching devices, such as P-type MOSFETs, BJTs, and relays.

Further, the redistribution switches CSW1 to CSWn are installed in the inter-module charge equalization unit 110, but may be installed in the intra-module charge equalization units 1001 to 100n, and may be alternatively installed outside of both the intra-module charge equalization units 1001 to 100n and the inter-module charge equalization unit 110.

The voltage detection and drive signal generation unit 120 detects the voltages of respective M*N batteries, and sets both the first reference voltage, which is the average voltage of each battery module, that is, M series-connected batteries, and the second reference voltage, which is the average voltage of the N battery modules.

Thereafter, the voltage detection and drive signal generation unit 120 compares the voltages of the M*N batteries with the first reference voltage or the second reference voltage, and generates a drive signal to discharge overcharged batteries or battery modules when the detected voltages are greater than the first reference voltage or the second reference voltage, that is, when relevant batteries are overcharged, and to charge undercharged batteries or battery modules when the detected voltages are less than the first reference voltage or the second reference voltage, that is, when relevant batteries are undercharged. The voltage detection and drive signal generation unit 120 provides the drive signal to the intra-module charge equalization units 1001 to 100n and the inter-module charge equalization unit 110.

As a result, the intra-module charge equalization units 1001 to 100n and the inter-module charge equalization unit 110 equalize the voltages of the N battery modules, as well as the voltages of the M batteries in each battery module, in response to the drive signal provided by the voltage detection and drive signal generation unit 120.

In this case, the voltage detection and drive signal generation unit 120 provides the drive signal, having a Pulse Width Modulation (PWM) format with a low duty ratio, to the redistribution switches CSW1 to CSWn in the case where only a small number of arbitrary batteries is charged with a charge when almost all of the charge/discharge control switches are turned on or when the charge equalization of the batteries is almost completed. This is performed to initially discharge a small amount of charge from the series-connected batteries in order to prevent excessive current from flowing into the batteries that are currently being charged.

The voltage detection and drive signal generation unit 120 includes a sensing unit 122, a microprocessor 124 and a switch driving circuit unit 126, as shown in FIG. 3.

The sensing unit 122 is connected to the M*N batteries and is configured to detect the voltages of respective M*N batteries.

The microprocessor 124 sets the average voltage of the voltages of the M series-connected batteries, that is, the batteries existing in each module, among the M*N batteries, the voltages of which are detected by the sensing unit 122, as the first reference voltage, and sets the average voltage of the N battery modules as the second reference voltage. Accordingly, if it is determined that the voltages detected by the sensing unit 122 are greater than, or have the possibility of being greater than, the first reference voltage or the second reference voltage, the microprocessor 124 sets the ON/OFF times of the charge/discharge control switches SW1 to SWm and the redistribution switches CSW1 to CSWn, which are required to charge/discharge corresponding batteries or battery modules.

The switch driving circuit unit 126 generates drive signals on the basis of the signal input from the microprocessor 124, and separately provides the drive signals to the charge/discharge control switches SW1 to SWm and the redistribution switches CSW1 to CSWn.

The charge equalization method for battery modules performed by the above-described charge equalization apparatus according to the embodiment of the present invention will be described below with reference to FIGS. 4 and 5.

In this case, the charge equalization apparatus according to the embodiment of the present invention is implemented on the basis of fundamental rules in which the charge equalization of series-connected batteries is performed when an electrical charging device or an electrical load is not connected to the series-connected batteries. However, when current capacity is so high that the intra-module charge equalization units 1001 to 100n and the inter-module charge equalization unit 110 act as a bypass circuit, or when the magnitude of charging current or discharging current is small, the charges of series-connected batteries can be equalized even if an electrical charging device or an electrical load is connected to the series-connected batteries.

First, the voltage detection and drive signal generation unit 120 detects the voltages of respective M series-connected batteries.

At this time, the voltage detection and drive signal generation unit 120 sets the average voltage of the voltages of the M series-connected batteries, that is, a battery module into which M batteries are grouped, as the first reference voltage, and compares the detected voltages with the first reference voltage. In order to discharge overcharged batteries or nearly overcharged batteries, among the M series-connected batteries, when it is determined that the detected voltages are greater than or have the possibility of being greater than the first reference voltage, and in order to charge batteries undercharged to voltages less than the first reference voltage, the voltage detection and drive signal generation unit 120 provides a low-level second drive signal to the charge/discharge control switches, which are connected in series with the primary windings of the first transformer units connected in parallel with overcharged batteries, and provides a high-level first drive signal to the charge/discharge control switches, which are connected in series with the primary windings of the first transformer units connected in parallel with undercharged batteries.

Figure 4:
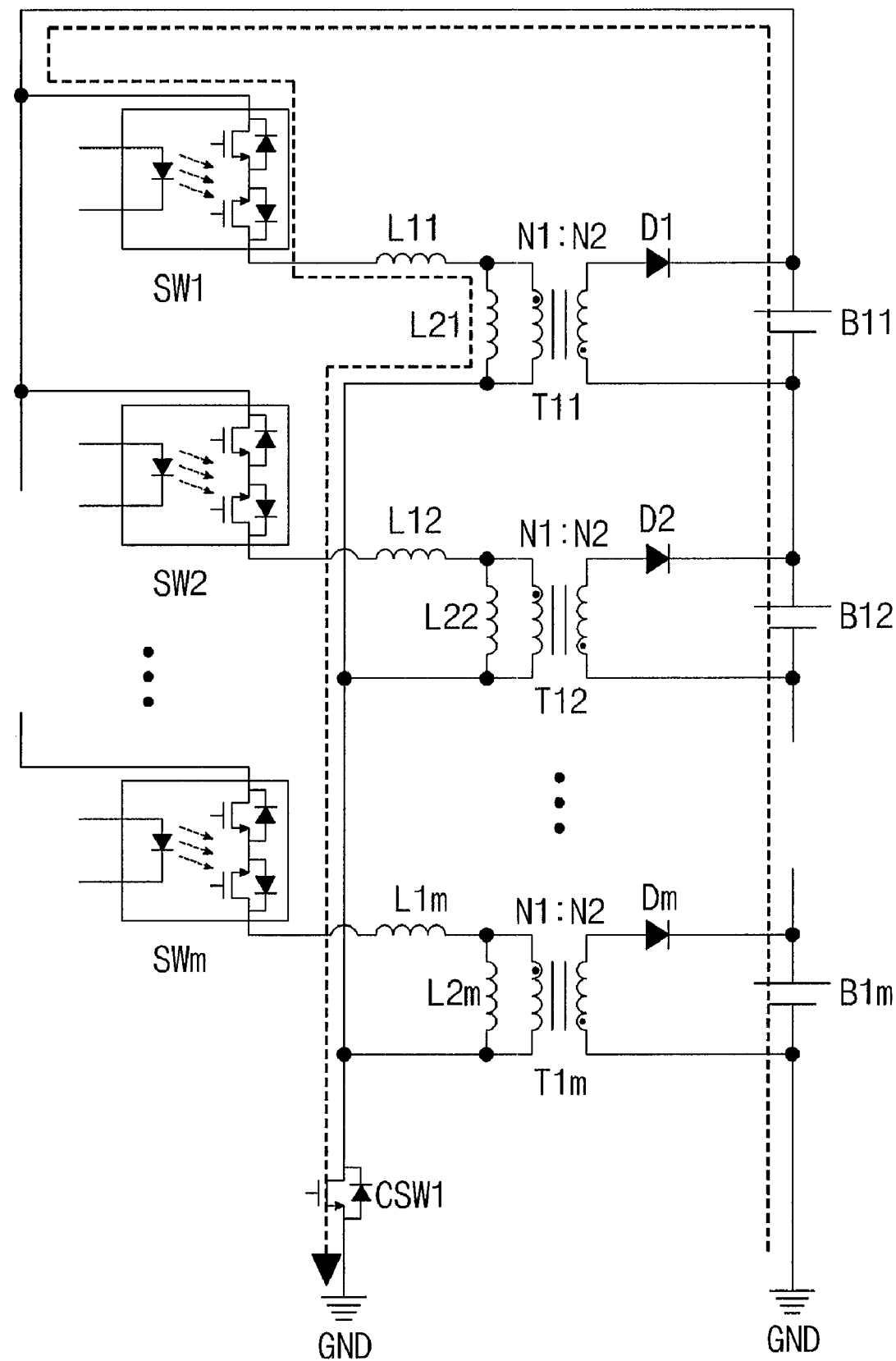
FIGS. 4 and 5 are diagrams showing a charge equalization method performed by the intra-module charge equalization unit of FIG. 2.

For example, as shown in FIG. 4, when it is assumed that the first battery among the M series-connected batteries is undercharged, and the remaining batteries are overcharged, the voltage detection and drive signal generation unit 120 turns on the first charge/discharge control switch SW1 by providing the high-level first drive signal to the first charge/discharge control switch SW1, and turns off the remaining charge/discharge control switches SW2 to SWm.

Further, the voltage detection and drive signal generation unit 120 provides the high-level first drive signal to the redistribution switch CSW1.

Accordingly, as shown in FIG. 4, the charge from the battery module is supplied to the primary winding of the first transformer T11, connected in parallel with the undercharged first battery B1, through the first charge/discharge control switch SW1. In this case, current from the battery module is stored in the second inductor L21 in the form of magnetizing current.

Thereafter, the voltage detection and drive signal generation unit 120 turns off the redistribution switch CSW1 by providing a low-level second drive signal to the redistribution switch CSW1.

Figure 5:
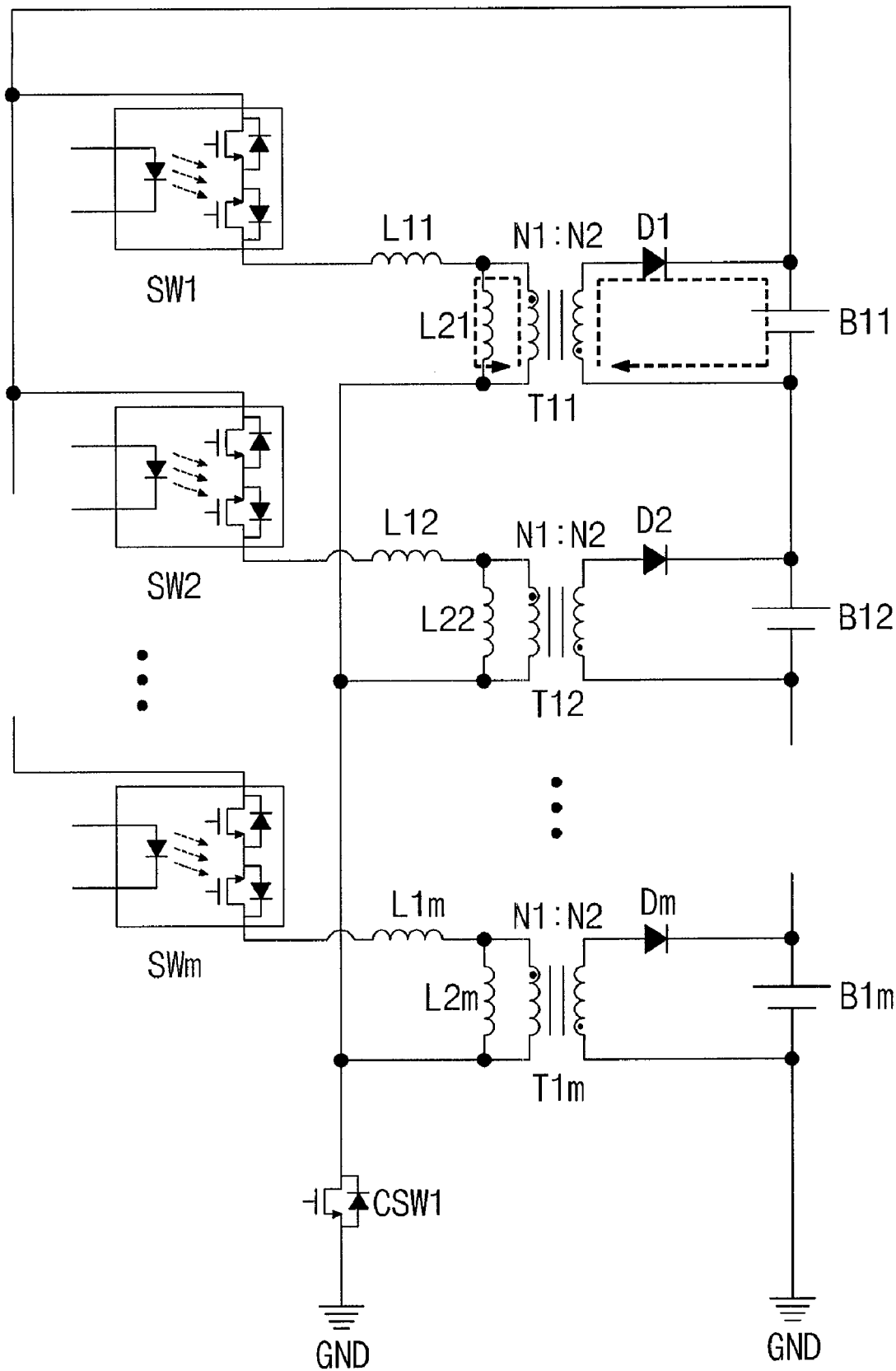

Accordingly, the energy stored in the second inductor L21 is transferred from the primary winding of the first transformer T11 to the secondary winding thereof, as shown in FIG. 5. The energy transferred to the secondary winding is converted into a charge by the diode D1, and is supplied to the undercharged first battery B11.

As a result, the undercharged first battery B11 is charged with the charge supplied by the secondary winding, thus enabling entire charge equalization to be realized over the M series-connected batteries in the module.

The inter-module charge equalization method, performed by the charge equalization apparatus having the above construction, will be described below with reference to FIGS. 6 and 7.

Figure 6:
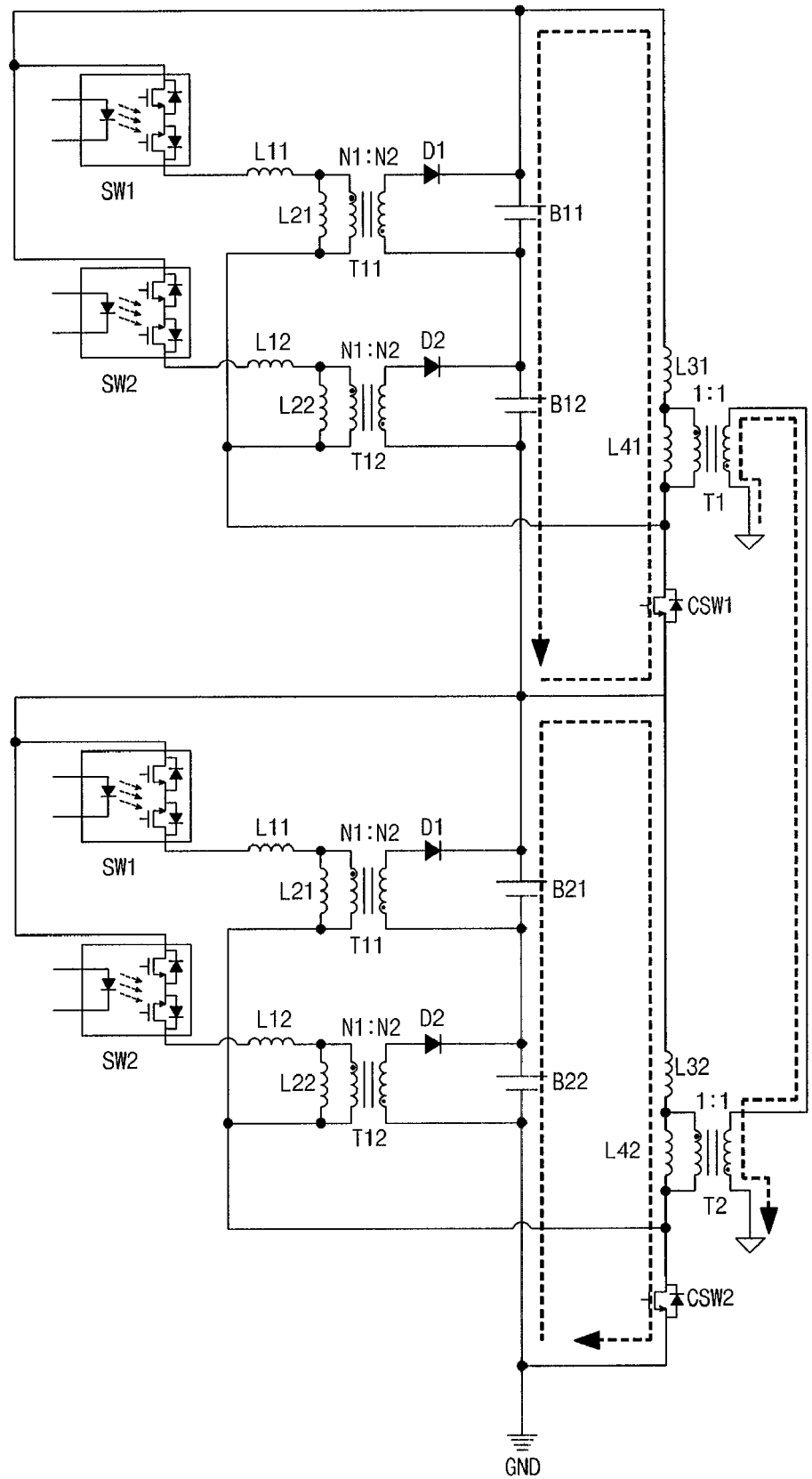
FIG. 6 is a diagram showing a charge equalization method performed by the inter-module charge equalization unit of FIG. 2.

For example, as shown in FIG. 6, when M and N are 2, the voltage detection and drive signal generation unit 120 provides the low-level second drive signal to the first charge/discharge control switch SW1 and the second charge/discharge control switch SW2, which are provided in each intra-module charge equalization unit, thus turning off both the first charge/discharge control switch SW1 and the second charge/discharge control switch SW2.

Thereafter, the voltage detection and drive signal generation unit 120 detects the voltages of two respective battery modules, and sets the average voltage of the two battery modules as a second reference voltage.

After the second reference voltage has been set, the voltage detection and drive signal generation unit 120 turns on the first redistribution switch CSW1 and the second redistribution switch CSW2 by providing the high-level first drive signal both to the first redistribution switch CSW1 and to the second redistribution switch CSW2 in order to discharge one of the two battery modules, which is overcharged to the voltage greater than the second reference voltage, and to charge the remaining one thereof, which is undercharged to the voltage less than the second reference voltage.

Accordingly, the first redistribution switch CSW1 forms a closed loop so that the voltage of the batteries B11 and B12 of the first battery module is supplied to the primary winding of the second transformer T1, and the second redistribution switch CSW2 forms a closed loop so that the voltage of the batteries B21 and B22 of the second battery module is supplied to the primary winding of the second transformer T2.

At this time, the voltages applied to the primary windings of the second transformers T1 and T2 are induced on the respective secondary windings thereof.

However, when the voltage of the first battery module B11 and B12 is lower than that of the second battery module B21 and B22, the movement of current occurs due to the difference between the voltages of the first battery module B11 and B12 and the second battery module B21 and B22 because the secondary windings of the second transformers T1 and T2 are connected in parallel.

Accordingly, charge moves from the second battery module B21 and B22 to the first battery module B11 and B12, so that the voltages of the first battery module B11 and B12 and the second battery module B21 and B22 are equalized.

In the above embodiment, the voltage detection and drive signal generation unit 120 is described to separately set the first reference voltage and the second reference voltage, but may generate drive signals required to realize intra-module charge equalization and inter-module charge equalization using only the first reference voltage.

That is, when inter-module charge equalization is performed, the voltage detection and drive signal generation unit 120 may perform inter-module charge equalization by turning on the redistribution switches CSW1 to CSWn, without detecting the voltages of the N battery modules.

In the charge equalization method performed by the charge equalization apparatus according to the present invention, intra-module charge equalization and inter-module charge equalization are separately described, but, in practice, the intra-module charge equalization units and the inter-module charge equalization unit simultaneously perform intra-module charge equalization and inter-module charge equalization.

For reference, during the operation of the inter-module charge equalization unit 110, the resetting of the fourth inductors L41 and L42 is performed by an arbitrary undercharged battery existing in an undercharged battery module.

Figure 7:
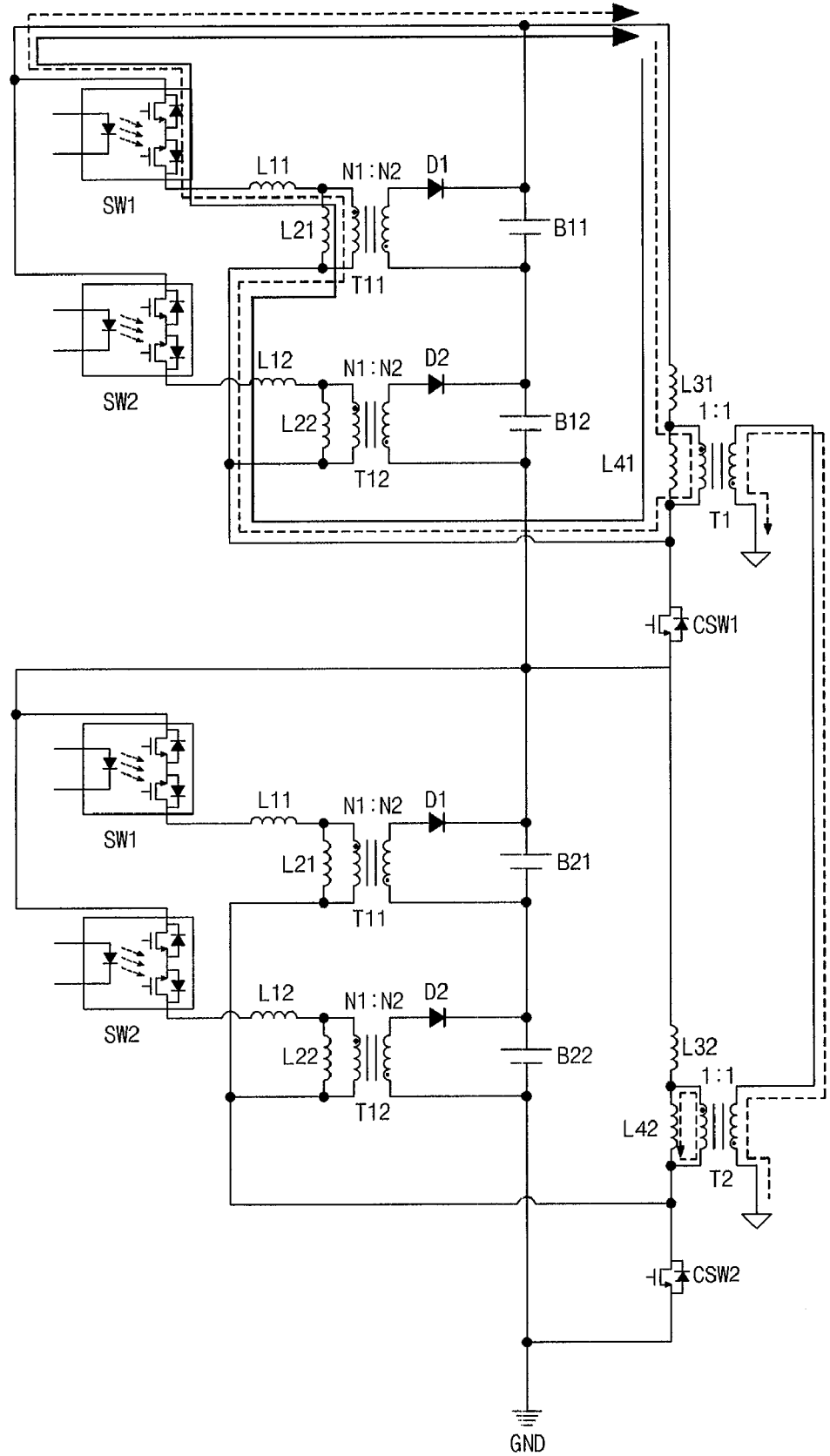
FIG. 7 is a diagram showing a magnetizing current reset method performed by the charge equalization apparatus of FIG. 2 according to an embodiment of the present invention.

For example, in FIG. 7, when the first redistribution switch CSW1 and the second redistribution switch CSW2 are simultaneously turned on and are then turned off, the primary-side voltage of the first battery cell of the first module is applied to the primary sides of the second transformers T1 and T2 of the inter-module charge equalization unit, so that magnetizing current is reset. Accordingly, the diode, which is used in the conventional charge equalization apparatus, can be obviated in the charge equalization apparatus according to the embodiment of the present invention.

In addition, the magnetizing current, flowing through the fourth inductors L41 and L42, flows into the undercharged battery through the primary winding of the first transformer, connected in parallel with the undercharged battery, and the charge/discharge control switch, which is a bidirectional switch, thus obtaining an advantage in that charging time can be reduced.

Further, in the charge equalization apparatus according to the embodiment of the present invention, since reset current flows into the undercharged battery, the turns ratio of the transformer is 1:1, and thus transformers can be easily manufactured.

Figure 8:
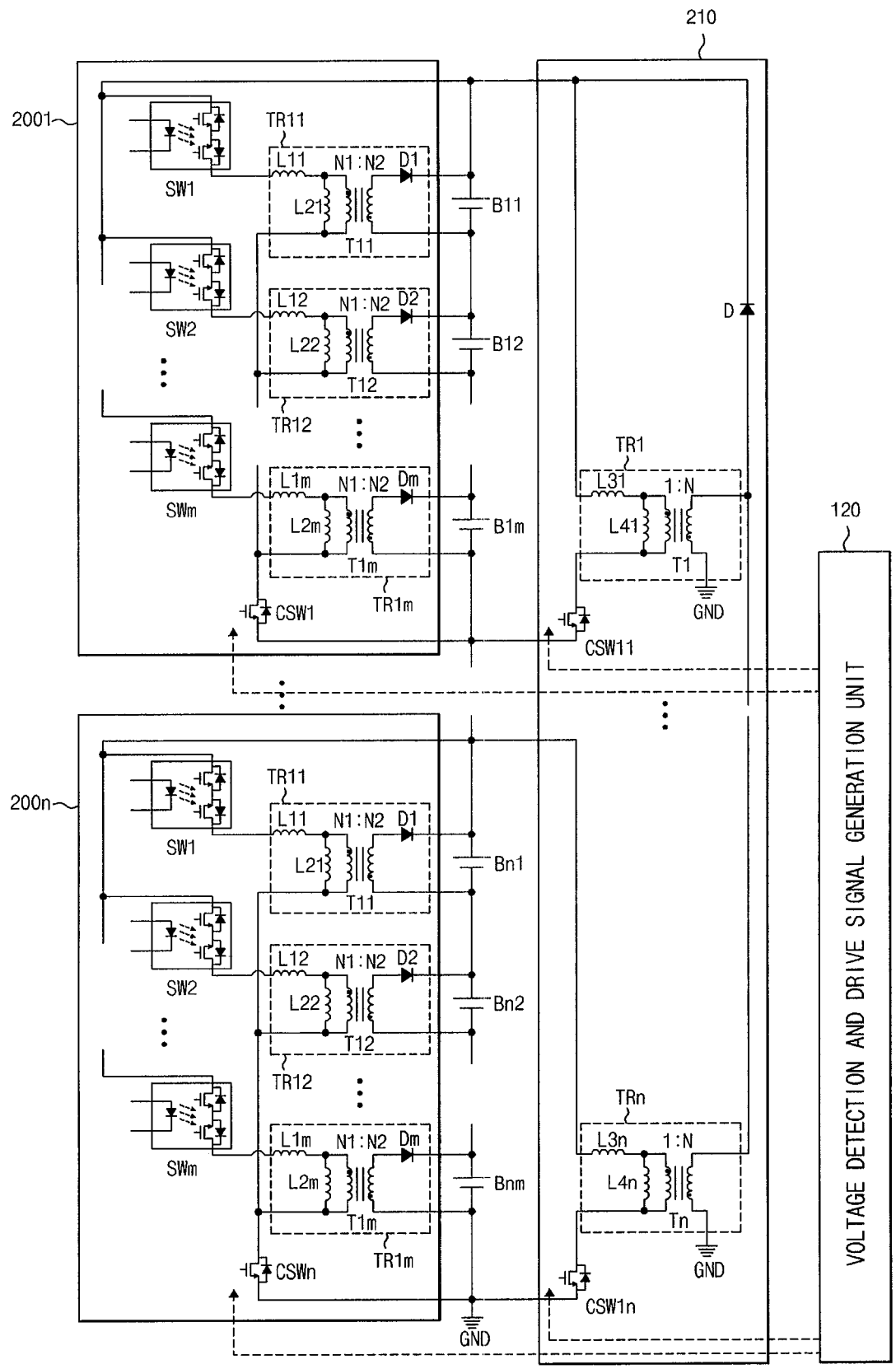
FIG. 8 is a diagram showing a charge equalization apparatus according to another embodiment of the present invention.

FIG. 8 is a diagram showing a charge equalization apparatus according to another embodiment of the present invention.

Referring to FIG. 8, the charge equalization apparatus according to another embodiment of the present invention includes N intra-module charge equalization units 2001 to 200n, each connected in parallel with respective M series-connected batteries, supplied with a charge from the M series-connected batteries, and configured to equalize the charges of the M series-connected batteries by discharging overcharged batteries and charging undercharged batteries when M*N batteries are connected in series and are divided into N battery modules, each having M series-connected batteries, an inter-module charge equalization unit 210 connected in parallel with respective N battery modules and configured to discharge overcharged battery modules and to charge undercharged battery modules among N battery modules, thus equalizing the charges of the N battery modules, and a voltage detection and drive signal generation unit 120 configured to detect the voltages of respective M*N batteries, set the average voltage of the detected voltages to a reference voltage, generate a drive signal using both the detected voltages and the reference voltage, and control the driving of the N intra-module charge equalization units 2001 to 200n and the inter-module charge equalization unit 210 by providing the generated drive signal to the N intra-module charge equalization units 2001 to 200n and the inter-module charge equalization unit 210.

Here, since the M series-connected batteries can be grouped into a module, they can be designated as a battery module.

Each of the N intra-module charge equalization units 2001 to 200*n* includes M first transformer units TR11 to TR1*m*, which are respectively connected in parallel with the M series-connected batteries and are configured to store a charge supplied by the M series-connected batteries and to supply the stored charge to undercharged batteries, among the M series-connected batteries, thus equalizing the charges of the M series-connected batteries, M charge/discharge control switches SW1 to SWm, which are connected between the first ends (terminals on which dots are formed) of the primary windings of the M first transformer units TR11 to TR1*m* and the cathode (+) of the first battery B11, B21, . . . , or Bn1 of the M series-connected batteries so as to supply the charge, supplied by the M series-connected batteries, to the primary windings of the first transformer units TR11 to TR1*m*, M semiconductor switching devices D1 to Dm, which are connected between the first ends (terminals on which dots are not formed) of the secondary windings of the first transformer units TR11 to TR1*m* and the cathodes (+) of the M series-connected batteries so as to prevent a charge, supplied by the M series-connected batteries, from being supplied to the secondary windings of the first transformer units TR11 to TR1*m*, and a first redistribution switch CSW1 to CSWn, which is connected between the common node of the second ends (terminals on which dots are not formed) of the primary windings of the first transformer units TR11 to TR1*m* and the anode (−) of the last battery B1*m*, B2*m*, . . . , or Bnm of a corresponding battery module in order to form a closed loop so that the charge from the battery module is supplied to the primary windings of the first transformer units TR11 to TR1*m*.

The first transformer units TR11 to TR1*m* are respectively connected in parallel with the M series-connected batteries so as to decrease the voltages of batteries having voltages greater than a first reference voltage in each battery module, that is, overcharged batteries, to the first reference voltage, and to increase the voltages of batteries having voltages less than the first reference voltage, that is, undercharged batteries, to the first reference voltage.

Here, the term 'first reference voltage' means the average voltage of each battery module, that is, M series-connected batteries.

Each of the M first transformer units TR11 to TR1*m* includes a first transformer T11 to T1*m*, which is connected in parallel with a corresponding one of the M series-connected batteries and is configured to store a charge, supplied by the M series-connected batteries, and to supply the stored charge to undercharged batteries among the M series-connected batteries, a first inductor L11 to L1*m*, which is connected between the first end of the primary winding of the first transformer T11 to T1*m* and a corresponding one of the charge/discharge control switches SW1 to SWm, and a second inductor L21 to L2*m*, which is connected between both ends of the primary winding of the first transformer T11 to T1*m* so as to store a charge, supplied by the M series-connected batteries B1 to Bn, in the form of magnetizing current.

The first ends of the primary windings of the first transformers T11 to T1*m* are respectively connected to the first inductors L11 to L1*m*, and the second ends (terminals on which dots are not formed) of the primary windings thereof are connected in common to the first end of the corresponding first redistribution switch CSW1 to CSWn. The first ends (terminals on which dots are not formed) of the secondary windings are respectively connected to the anodes of the semiconductor switching devices D1 to Dm, and the second ends thereof (terminals on which dots are formed) are respectively connected to the anodes (−) of the batteries.

The above-described first transformers T11 to T1*m* are each implemented in the form of a flyback structure, in which a primary winding and a secondary winding have different polarities, that is, in which a dot formed on the primary winding and a dot formed on the secondary winding are placed on different sides. Each of the first transformers T11 to T1*m* has a turns ratio of the primary winding to the secondary winding of N1:N2.

In this embodiment, each of the first transformers T11 to T1*m* is implemented using a flyback structure, but may be implemented using a forward structure, in which a dot formed on a primary winding and a dot formed on a secondary winding are placed on the same side.

The first inductors L11 to L1*m* are connected between the primary windings of the first transformers T11 to T1*m* and the charge/discharge switches SW1 to SWm, and the second inductors L21 to L2*m* are connected between both ends of the primary windings of the first transformers T11 to T1*m*.

In this case, the second inductors L21 to L2*m* store the charge supplied by a relevant battery module in the form of magnetizing current when the charge/discharge control switches SW1 to SWm and the first redistribution switches CSW1 to CSWn are turned on.

The charge/discharge control switches SW1 to SWm are respectively connected between the cathode (+) of the first battery B11, B21, . . . , or Bn1 of the M series-connected batteries and the first inductors L11 to L1*m*, and are configured such that they are turned on in response to a high-level first drive signal, which is provided by the voltage detection and drive signal generation unit 120, and form a closed loop so that the charge from the battery module is supplied to the primary windings of the first transformer units TR11 to TR1*m*.

In other words, the charge/discharge control switches SW1 to SWm are turned on in response to the high-level first drive signal provided by the voltage detection and drive signal generation unit 120, thus forming a closed loop so that the charge supplied by the M series-connected batteries can be supplied both to the first inductors L11 to L1*m* and to the second inductors L21 to L2*m*, which are connected to the primary windings of the first transformer units TR11 to TR1*m*.

Accordingly, when the charge/discharge control switches SW1 to SWm are turned on, magnetizing current is stored in the second inductors L21 to L2*m*.

Further, the charge/discharge control switches SW1 to SWm are turned off in response to a low-level second drive signal, provided by the voltage detection and drive signal generation unit 120, thus preventing the charge supplied by the battery module from being supplied to the primary windings of the first transformer units TR11 to TR1*m*.

The high-level first drive signal is provided to the above-described charge/discharge control switches SW1 to SWm for a longer time so that batteries having relatively low voltages, among the M series-connected batteries, are charged for a longer time, and is provided to the switches SW1 to SWm for a shorter time so that batteries having relatively high voltages are charged for a shorter time.

That is, when it is assumed that M is 3, in other words, when three batteries are connected in series in a single module, and, of the batteries, the second battery is overcharged and the remaining batteries are undercharged, the high-level first drive signal is provided to a charge/discharge control switch corresponding to one of the first and third batteries, having a higher voltage, for a shorter time, and is provided to a charge/discharge control switch corresponding to the remaining one of the first and third batteries, having a lower voltage, for a longer time.

The charge/discharge control switches SW1 to SWm are electrically insulated, and are implemented using solid-state relays, enabling bidirectional current flow.

The first semiconductor switching devices D1 to Dm are respectively connected between the first ends of the secondary windings of the first transformers T11 to T1m and the cathodes (+) of the M series-connected batteries, and function to rectify energy when the energy supplied to the secondary windings of the first transformers T11 to T1m is supplied to the relevant battery module.

Further, the first semiconductor switching devices D1 to Dm prevent the charge supplied by the battery module from being supplied to the secondary windings of the first transformers T11 to T1m.

The first semiconductor switching devices D11 to D1m are implemented using diodes, but may be implemented using one of switching devices, such as MOSFETs, BJTs, and relays.

The first redistribution switches CSW1 to CSWn are connected between the common nodes of the second ends of the primary windings of the first transformer units TR11 to TR1m and the anodes (−) of the last batteries B1m, B2m, ..., Bnm of respective battery modules and are configured such that they are turned on in response to the high-level first drive signal, provided by the voltage detection and drive signal generation unit 120, and form closed loops so that charge supplied by the M series-connected batteries, that is, each battery module, is supplied to the primary windings of the first transformer units TR11 to TR1m.

The first redistribution switches CSW1 to CSWn are implemented using N-type MOSFETs, but are not limited to N-type MOSFETs, and may be implemented using any one of switching devices, such as P-type MOSFETs, BJTs, and relays.

The inter-module charge equalization unit 210 includes N second transformer units TR1 to TRn, which are connected in parallel with the N series-connected battery modules and are configured to store a charge supplied by the N series-connected battery modules, and to supply the stored charge to undercharged battery modules among the N series-connected battery modules, thus equalizing the charges of the N series-connected battery modules, N second redistribution switches CSW11 to CSW1n, which are connected between the second ends of the primary windings of the second transformer units TR1 to TRn and the anodes (−) of the last batteries B1m, B2m, ..., Bnm of respective battery modules so as to form closed loops so that the charge supplied by the battery modules is supplied to the primary windings of the second transformer units TR1 to TRn, and a second semiconductor switching device D, which is connected between the cathode (+) of the first battery B11 of the M*N series-connected batteries and the common node of the first ends of the secondary windings of the second transformer units TR1 to TRn so as to supply the magnetizing current of the fourth inductors L41 to L4n to the undercharged batteries among the N series-connected battery modules.

The second transformer units TR1 to TRn are connected in parallel with respective battery modules so as to decrease the voltages of overcharged battery modules among the N battery modules to a second reference voltage and to increase the voltages of the undercharged battery modules to the second reference voltage.

Here, the term 'second reference voltage' means the average voltage of N battery modules.

Each of the second transformer units TR1 to TRn includes a second transformer T1 to Tn, which is connected in parallel with a corresponding one of the N series-connected battery modules and is configured to store a charge supplied by the N series-connected battery modules and to supply the stored charge to an undercharged battery modules among the N series-connected battery modules, a third inductor L31 to L3n, which is connected between the first end (terminal on which a dot is formed) of the primary winding of the second transformer T1 to Tn and the cathode (+) of the first battery B11, B21, ..., or Bn1 of a corresponding battery module, and a fourth inductor L41 to L4n, which is connected between both ends of the primary winding of the second transformer T1 to Tn so as to store a charge supplied by the N series-connected battery modules in the form of magnetizing current.

Accordingly, the first ends of the primary windings of the second transformers T1 to Tn are respectively connected to the third inductors L31 to L3n, and the second ends thereof (terminals on which dots are not formed) are connected both to the common nodes of the second ends of the primary windings of the first transformer units TR11 to TR1m, respectively installed in the intra-module charge equalization units 2001 to 200n, and to the second redistribution switches CSW11 to CSW1n. The first ends (terminals on which dots are not formed) of the secondary windings are connected in common to each other, and the second ends thereof (terminals on which dots are formed) are connected to the ground GND.

Each of the second transformers T1 to Tn is implemented using a flyback structure, in which a primary winding and a secondary winding have different polarities, that is, in which a dot formed on the primary winding and a dot formed on the secondary winding are placed on different sides, and has a turns ratio of the primary winding to the secondary winding of 1:N.

In this embodiment, each of the second transformers T1 to Tn is implemented using the flyback structure, but may be implemented using a forward structure, in which primary and second windings have the same polarity, that is, in which dots formed on the primary and secondary windings are placed on the same side.

The third inductors L31 to L3n are respectively connected between the primary windings of the second transformers T1 to Tn and the cathodes (+) of the first batteries B11, B21, ..., Bn1 of respective battery modules, and the fourth inductors L41 to L4n are connected between both ends of the primary windings of the second transformers T1 to Tn.

In this case, the fourth inductors L41 to L4n store a charge supplied by the N battery modules in the form of magnetizing current when the second redistribution switches CSW11 to CSW1n are turned on.

The second redistribution switches CSW11 to CSW1n are connected between the second ends of the secondary windings of the second transformer units TR1 to TRn and the anodes (−) of the last batteries B1m, B2m, ..., Bnm of respective battery modules, and are configured such that they are turned on in response to a high-level first drive signal, provided by the voltage detection and drive signal generation unit 120, and form closed loops so that a charge can move from a battery module having a relatively high voltage to a battery module having a relatively low voltage at the same time that the charge supplied by the N series-connected battery modules is supplied to the primary windings of the second transformer units TR1 to TRn.

The second redistribution switches CSW11 to CSW1n are implemented using N-type MOSFETs, but are not limited to N-type MOSFETs, and may be implemented using one of switching devices, such as P-type MOSFETs, BJTs, and relays.

The second semiconductor switching device D is connected between the cathode (+) of the first battery B11 among the M*N series-connected batteries and the common node of the first ends of the second windings of the second transformer units TR1 to TRn, and is configured to prevent the charge supplied by the M*N series-connected batteries from being supplied to the secondary windings of the second transformer units TR1 to TRn, and to recharge the magnetizing current of the fourth inductors L41 to L4n in the M*N series-connected batteries.

The second semiconductor switching device D is implemented using a diode, but may be alternatively implemented using one of switching devices, such as a MOSFET, a BJT, and a relay.

The voltage detection and drive signal generation unit 120 detects the voltages of respective M*N batteries, and sets the first reference voltage, which is the average voltage of each battery module, that is, M series-connected batteries, and the second reference voltage, which is the average voltage of the N battery modules.

Thereafter, the voltage detection and drive signal generation unit 120 compares the voltages of the M*N batteries with the first reference voltage or the second reference voltage, generates a drive signal to discharge overcharged batteries or battery modules when the detected voltages are greater than the first reference voltage or the second reference voltage, that is, when relevant batteries are overcharged, and to charge undercharged batteries or battery modules when the detected voltages are less than the first reference voltage or the second reference voltage, that is, when relevant batteries are undercharged, and provides the drive signal to the intra-module charge equalization units 2001 to 200n and the inter-module charge equalization unit 210.

As a result, the intra-module charge equalization units 2001 to 200n and the inter-module charge equalization unit 210 equalize the voltages of the N battery modules, as well as the voltages of the batteries in each battery module, in response to the drive signal provided by the voltage detection and drive signal generation unit 120.

In this case, the voltage detection and drive signal generation unit 120 provides the drive signal, having a Pulse Width Modulation (PWM) format with a low duty ratio, to the redistribution switches CSW1 to CSWn in the case where only a small number of arbitrary batteries is charged with a charge when almost all of the charge/discharge control switches are turned on or when the charge equalization of the batteries is almost completed. This is performed to initially discharge a small amount of charge from the series-connected batteries in order to prevent excessive current from flowing into the batteries that are currently being charged.

The voltage detection and drive signal generation unit 120 includes a sensing unit 122, a microprocessor 124 and a switch driving circuit unit 126, as shown in FIG. 3.

The sensing unit 122 is connected to the M*N batteries and is configured to detect the voltages of respective M*N batteries.

The microprocessor 124 sets the average voltage of the M series-connected batteries, that is, each battery module, among the M*N batteries, the voltages of which are detected by the sensing unit 122, as the first reference voltage, and sets the average voltage of the N battery modules as the second reference voltage. Accordingly, if it is determined that the voltages detected by the sensing unit 122 are greater than, or have the possibility of being greater than, the first reference voltage or the second reference voltage, the microprocessor 124 sets the ON/OFF times of the charge/discharge control switches SW1 to SWm, the first redistribution switches CSW1 to CSWn, and the second redistribution switches CSW11 to CSW1n, which are required to charge/discharge corresponding batteries or battery modules.

The switch driving circuit unit 126 generates drive signals on the basis of the signal input from the microprocessor 124, and provides the drive signals to the charge/discharge control switches SW1 to SWm, the first redistribution switches CSW1 to CSWn, and the second redistribution switches CSW11 to CSW1n.

The intra-module charge equalization method and inter-module charge equalization method performed by the charge equalization apparatus according to another embodiment of the present invention are identical to those performed by the charge equalization apparatus according to the above embodiment of the present invention, and thus a detailed description thereof is omitted.

Figure 9:
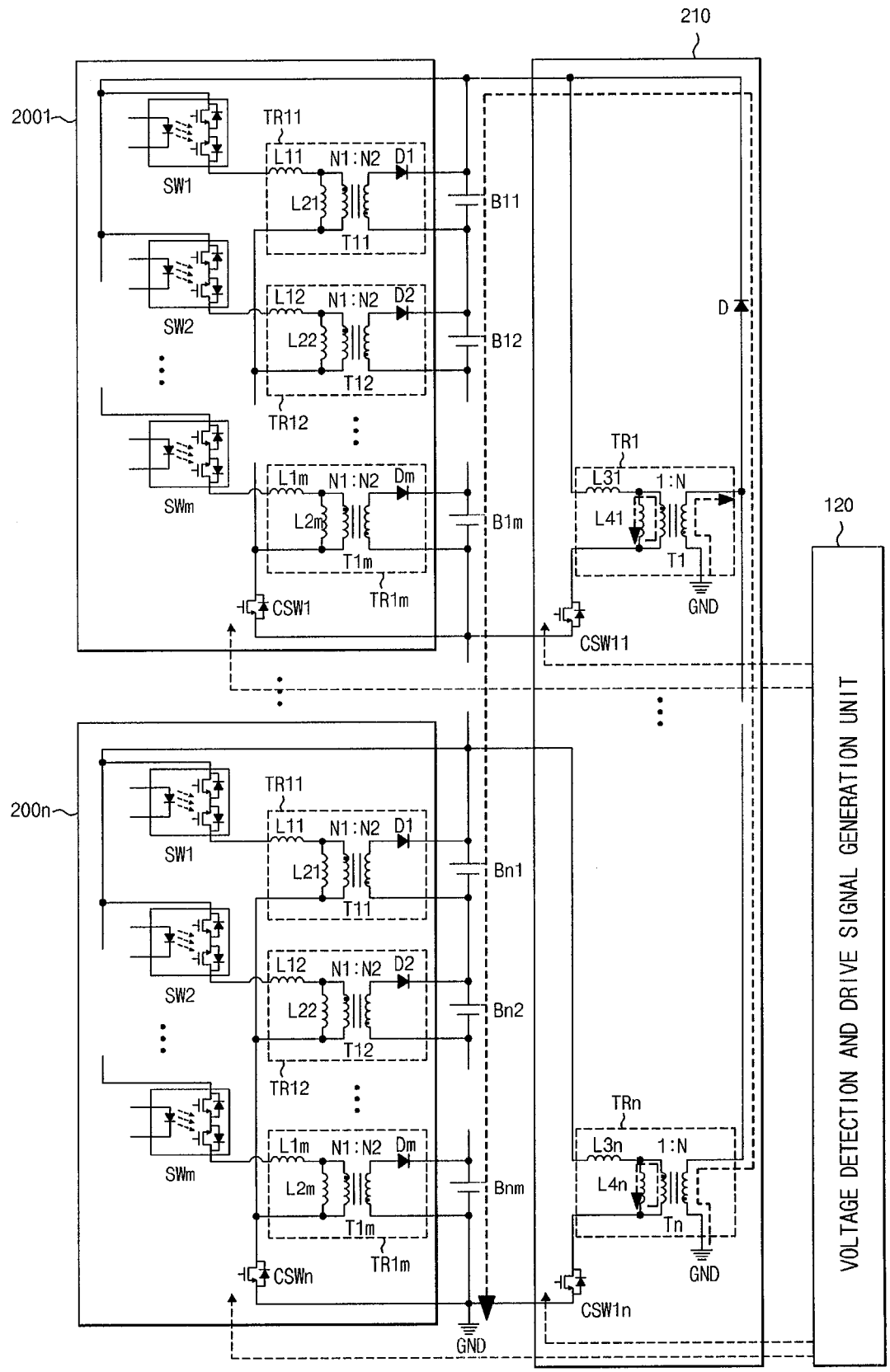
FIG. 9 is a diagram showing a magnetizing current reset method performed by the charge equalization apparatus of FIG. 8 according to another embodiment of the present invention.

However, the charge equalization apparatus according to another embodiment of the present invention is characterized in that, as shown in FIG. 9, magnetizing current, stored in the fourth inductors L41 to L4n, is supplied to the M*N series-connected batteries through the second semiconductor switching device D, and is thus reset.

Furthermore, the charge equalization apparatus according to another embodiment of the present invention may first equalize the charges of the batteries in each module and subsequently equalize the charges of batteries between respective modules, or may simultaneously equalize the charges of batteries in each module and the charge of the batteries between respective modules.

The invention claimed is:

1. A charge equalization apparatus for equalizing charges of M*N batteries, the charge equalization apparatus being configured such that the M*N batteries are connected in series and are divided into N battery modules, each having M series-connected batteries, comprising:
   N intra-module charge equalization units, each connected in parallel with respective M series-connected batteries existing in each battery module, supplied with charge from the M series-connected batteries, and configured to discharge overcharged batteries and to charge undercharged batteries, thus equalizing charges of the M series-connected batteries;
   an inter-module charge equalization unit connected in parallel with respective N battery modules and configured to discharge overcharged battery modules, among the N battery modules, and to charge undercharged battery modules, thus equalizing charges of the N battery modules;
   a voltage detection and drive signal generation unit configured to detect voltages of respective M*N batteries, to set an average voltage of the detected voltages as a reference voltage, to generate a drive signal using both the detected voltages and the reference voltage, and to control driving of the N intra-module charge equalization units and the inter-module charge equalization unit by providing the generated drive signal to the N intra-module charge equalization units and the inter-module charge equalization unit; and
   wherein each of the N intra-module charge equalization units comprises: M first transformer units respectively connected in parallel with the M series-connected batteries, and configured to store a charge supplied by the M series-connected batteries and to supply the stored charge to undercharged batteries among the M series-connected batteries, thus equalizing charges of the M series-connected batteries;

M charge/discharge control switches connected between first ends of primary windings of the first transformer units and an anode of a first battery of the M series-connected batteries so as to supply a charge supplied by the M series-connected batteries to the primary windings of the transformer units; and M first semiconductor switching devices connected between first ends of secondary windings of the first transformer units and anodes of the M series-connected batteries so as to prevent a charge supplied by the M series-connected batteries from being supplied to the secondary windings of the first transformer units.

2. The charge equalization apparatus according to claim 1, wherein each of the first transformer units comprises:

a first transformer connected in parallel with a corresponding one of the M series-connected batteries and configured to store a charge supplied by the M series-connected batteries and to supply the stored charge to undercharged batteries among the M series-connected batteries;

a first inductor connected between a first end of a primary winding of the first transformer and a corresponding one of the charge/discharge control switches; and a second inductor connected between both ends of the primary winding of the first transformer so as to store a charge supplied by the M series-connected batteries in a form of magnetizing current.

3. The charge equalization apparatus according to claim 1, wherein the charge/discharge control switches are bidirectional switches.

4. The charge equalization apparatus according to claim 3, wherein the charge/discharge control switches are solid-state relays.

5. The charge equalization apparatus according to claim 1, wherein, in each of the first transformer units, a turns ratio of the primary winding to the secondary winding is N1:N2.

6. The charge equalization apparatus according to claim 5, wherein each of the first transformer units is configured such that a dot formed on the primary winding and a dot formed on the secondary winding are placed on different sides.

7. The charge equalization apparatus according to claim 5, wherein each of the first transformer units is configured such that a dot formed on the primary winding and a dot formed on the secondary winding are placed on a same side.

8. The charge equalization apparatus according to claim 1, wherein the inter-module charge equalization unit comprises:

N second transformer units connected in parallel with the N series-connected battery modules and configured to store a charge, supplied by the N series-connected battery modules, and to supply the stored charge to undercharged battery modules, among the N series-connected battery modules, thus equalizing charges of the N series-connected battery modules; and N first redistribution switches connected between second ends of primary windings of the second transformer units and cathodes of last batteries of respective battery modules in order to form closed loops so that a charge supplied by the battery modules is supplied to the primary windings of the first transformer units and the primary windings of the second transformer units.

9. The charge equalization apparatus according to claim 8, wherein each of the second transformer units comprises:

a second transformer connected in parallel with a corresponding one of the N series-connected battery modules and configured to store a charge, supplied by the N series-connected battery modules, and to supply the stored charge to undercharged battery modules among the N series-connected battery modules;

a third inductor connected between a first end of a primary winding of the second transformer and an anode of a first battery of a corresponding battery module; and a fourth inductor connected between both ends of the primary winding of the second transformer so as to store a charge, supplied by the N series-connected battery modules, in a form of magnetizing current.

10. The charge equalization apparatus according to claim 8, wherein, in each of the second transformer units, a number of turns of a primary winding and a number of turns of a secondary winding are identical to each other.

11. The charge equalization apparatus according to claim 8, wherein each of the second transformer units is configured such that a dot formed on the primary winding and a dot formed on the secondary winding are placed on different sides.

12. The charge equalization apparatus according to claim 8, wherein each of the first transformer units is configured such that a dot formed on the primary winding and a dot formed on the secondary winding are placed on a same side.

13. The charge equalization apparatus according to claim 8, wherein the intra-module charge equalization units further comprise respective N second redistribution switches connected between common nodes of primary windings of the first transformer units and cathodes of last batteries of respective battery modules so as to form a closed loop so that a charge supplied by the battery modules is supplied to the primary windings of the first transformer units.

14. The charge equalization apparatus according to claim 13, wherein the inter-module charge equalization unit further comprises a second semiconductor switching device connected between an anode of a first battery of the M*N series-connected batteries and a common node of first ends of the secondary windings of the second transformer units so as to supply magnetizing current supplied by fourth inductors to the N series-connected battery modules.

15. The charge equalization apparatus according to claim 13, wherein the first redistribution switches and the second redistribution switches are Metal Oxide Semiconductor Field Effect Transistors (MOSFETs), Bipolar Junction Transistors (BJTs), or relays.

16. The charge equalization apparatus according to claim 15, wherein the first redistribution switches and the second redistribution switches are N-type MOSFETs.

17. The charge equalization apparatus according to claim 14, wherein the first redistribution switches and the second redistribution switches are MOSFETs, BJTs, relays or diodes.

18. The charge equalization apparatus according to claim 17, wherein the first semiconductor switching devices and the second semiconductor switching devices are diodes.

19. The charge equalization apparatus according to claim 1, wherein the voltage detection and drive signal generation unit comprises:

a sensing unit for detecting voltages of each of the respective M*N batteries;

a microprocessor for setting the average voltage of the voltages detected by the sensing unit as the reference voltage, and setting ON/OFF times of charge/discharge control switches and redistribution switches on the basis of the reference voltage and the voltages detected by the sensing unit; and a switch driving circuit unit for generating the drive signal required to drive the charge/discharge control switches and the redistribution switches on the basis of a signal input from the microprocessor.

* * * * *